United States Patent

[11] 3,582,800

[72] Inventors Klaus Lehmann
Darmstadt;
Emil Siegel, Darmstadt-Arheilgen;
Manfred Kreuzer, Gross-Zimmern, all of, Germany
[21] Appl. No. 857,602
[22] Filed Sept. 12, 1969
[45] Patented June 1, 1971
[73] Assignee Fernseh GmbH
Darmstadt, Germany
[32] Priority Oct. 5, 1966
[33] Germany
[31] F50361
Continuation of application Ser. No. 673,677, Oct. 4, 1967, now abandoned. This application Sept. 12, 1969, Ser. No. 857,602

[54] LOW-NOISE VIDEO AMPLIFIER
8 Claims, 4 Drawing Figs.

[52] U.S. Cl. ........ 330/18, 330/20, 330/25, 330/28, 330/35, 330/70, 330/97
[51] Int. Cl. ........ H03f 3/42, H03f 1/34
[50] Field of Search ........ 330/18, 20, 25, 28, 35, 38 FE, 70, 85, 97, 108

[56] References Cited
UNITED STATES PATENTS
3,001,144 9/1961 Dandl ........ 330/20X

*Primary Examiner*—Roy Lake
*Assistant Examiner*—James B. Mullins
*Attorney*—Michael S. Striker

ABSTRACT: A video signal amplifier having a low noise-to-signal ratio. The amplifier has a cascade stage with a high impedance input stage for amplifying the signal applied to it. A load resistor in the form of a voltage divider is connected to the output of the amplifier, and the output signal appears across this voltage divider. The voltage divider has a low ohmic branch which may be tapped off. A negative feedback resistor is connected across the low ohmic branch of the output voltage divider, and to the input stage of the amplifier. Through this arrangement the operating point of the input stage is exclusively established by the DC potential of the point at which the negative feedback resistor is connected to the output voltage divider or load resistor. The input signal to the amplifier may be capacitively coupled to the input stage. An impedance converter may also be connected to the amplifier output and to the cascade stage. An input resistor may be provided for applying the signal to be amplified to the input stage. The negative feedback resistor is of high impedance, of the order of 1 megohm. The amplifier is applicable as a video preamplifier for amplifying signals from television pickup tubes with high signal-to-noise ratio.

Inventors:
Emil Siegel
Klaus Lehmann
Manfred Kreuzer
by
Attorney

Inventors:
KLaus Lehmann
Emil Siegel
Manfred Kreuzer
by Michael S. Striker
Attorney

LOW-NOISE VIDEO AMPLIFIER

This application is a continuation of application Ser. No. 673,677 filed Oct. 4, 1967.

BACKGROUND OF THE INVENTION

In modern television techniques, a very high signal-to-noise ratio is required in video preamplifiers. This is due to the condition that the noise produced in the amplifier appears in the reproduced television picture with disturbing effects. The signal-to-noise ratio of the preamplifier is particularly important in color television cameras. In the latter reduced signal amplitude is realized, in any event, because of the suppression of specific color components from the light in the individual channels. Furthermore, it is often desirable to improve the resolution of the reproduced television picture, by boosting the high frequency components of the video signal. This is possible only when the signal-to-noise ratio of the preamplifier is sufficiently high.

Preamplifiers, commonly known in the art, and of recent development, use the cascade principle in which two amplifier elements are connected in series through their output circuits (see for example Wireless World, Mar. 1965, pages 124—128 ). Such cascade stages are desirable for video amplifiers due to their high gain and relatively low noise features. In particular designs, this cascade stage is followed by a cathode-follower or emitter-follower stage. Furthermore, negative feedback is employed to reduce the noise and to improve the frequency response. The voltage taken from the load resistance of the follower stage is applied to the input of the amplifier, via a high resistance element of, for example, 300 k ohms.

In the conventional circuits, the operating point of the first amplifier stage is determined by a voltage divider. The resistors comprising this voltage divider are of low ohmic value. As a result of this design, the signal-to-noise ratio of the amplifier is undesirably influenced by the current flowing through the voltage divider. Furthermore, if a negative feedback resistance is used as a component of the voltage divider, the value of the resistor cannot be chosen freely. It is accordingly, an object of the present invention to avoid the preceding undesirable features and to eliminate the disadvantages mentioned.

In order to achieve the object of the present invention, a low noise signal amplifier is provided which includes a cascade stage and a high impedance negative feedback circuit. Through this circuit, a signal voltage appearing across a low ohmic resistor is applied to the input of the amplifier, by way of a negative feedback resistor. The input stage of the amplifier has a high input resistance. The operating point of the input stage is determined substantially only by the potential appearing at that point in the circuit to which the negative feedback circuit is connected remotely from the amplifier input.

The video preamplifier in accordance with the present invention, possess considerable advantage over the conventionally known amplifiers from the viewpoint of signal-to-noise ratio and frequency response. The operating point of the amplifiers known in the art, is generally determined by a voltage divider which introduces noise effects because of the current flowing through the divider. When the amplifier is designed in accordance with the present invention, the operating point of the input stage is determined substantially only by the voltage which is applied from the tapping of the output resistance, This tapping is accomplished through the negative-feedback resistance in the design. The coupling of the signal source to the amplifier may, as a result of this design, be accomplished entirely through capacitive means. Furthermore, in accordance with the present invention, the magnitude of the negative feedback resistance may be chosen freely within very wide limits. The value of the negative feedback resistance is the only factor which determines the signal-to-noise ratio at low frequencies, as well as the frequency response. In the design of the present invention, therefore, a value of resistance may be employed which cannot be applied to conventional circuits. This is due to the condition that the negative feedback resistance is used to assist in determining the adjustment of the operating point of the input stage. In conventional designs, negative feedback resistors generally not exceeding 300 k ohms have been used. In the amplifier of the present invention, on the other hand, negative feedback resistances of the order of 1 megohm and higher may be used.

In accordance with the present invention, the amplifier circuit is designed so that only two elements are connected to the high impedance input of the first amplifier stage. These are the signal source which is coupled to the high impedance input by means of a capacitor, and the negative feedback resistance. There are no additional resistors of lower ohmic value than the negative feedback resistor in the circuit.

The views of the present invention permit the manufacture of a video preamplifier using only semiconductor amplifying elements. From the viewpoint of signal-to-noise ratio, such design is at least as good, if not superior, as the preamplifiers known heretofore in which thermionic valves prevail. Thus, the design of the present invention has the inherent advantage that the video preamplifier may be located in an extremely small amount of space. As a result of this feature, the video preamplifier may be positioned in the immediate neighborhood of the signal electrode from which the video signal is taken. Through such an arrangement in the physical placement of the component parts, the signal electrode to the amplifier introduces only a negligible amount of additional capacitance.

SUMMARY OF THE INVENTION

A video preamplifier having a high signal-to-noise ratio for amplifying signals from television pickup tubes. The amplifier includes a cascade stage having a high-impedance input stage. The cascade stage amplifies the signal applied to it. For purposes of providing a high input impedance, the input stage may be of a vacuum tube or field effect transistor. An impedance converter may also be included at the output stage of the signal amplifier. At the output of the amplifier is a load resistor in the form of a voltage divider having a low ohmic branch. A high ohmic negative feedback resistor is connected to the low ohmic branch of the load resistor. The negative feedback resistor is also connected to the input stage of the amplifier. If the input stage is, for example, a vacuum tube, the negative feedback resistor is connected to the control grid of the vacuum tube. A negative feedback resistor serves to feed back a portion of the signal appearing across the load resistor. By being connected across the low ohmic branch of the load resistor, the negative feedback resistor acts upon the input stage so that the operating point of the input stage is determined exclusively by the DC potential prevailing at the voltage dividing point at which the negative feedback resistor is connected to the load resistor of the amplifier.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
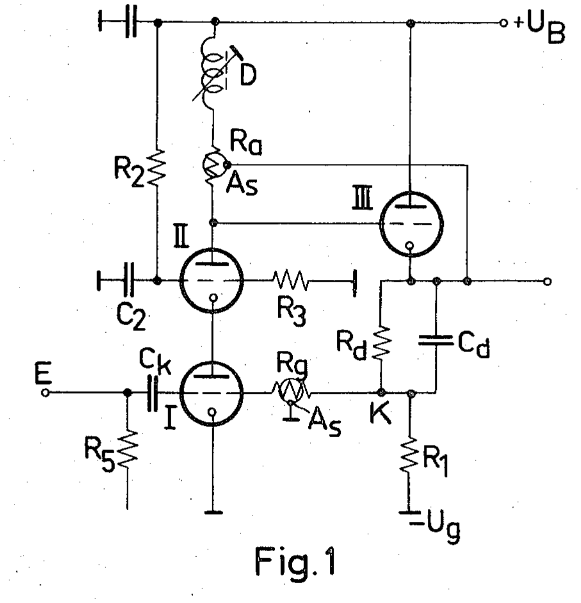
FIG. 1 is an electrical schematic diagram and shows the video amplifier, in accordance with the present invention, using nuvistor valves.

Referring to the drawing, FIG. 1 shows an embodiment of a cascade stage having nuvistor valves I and II and an impedance converter stage also provided with a nuvistor valve III. The value of the load resistance $R_a$ is approximately 7 k ohms, and leads to the power supply $U_B$, by way of a choke V. The anode of the impedance converter stage is connected directly to the supply $U_B$. The voltage to be amplified as, for example, the signal voltage from a vidicon pickup tube, is applied to the input terminal E. This input terminal E is connected to the control grid of the valve I, by way of the capacitor $C_K$. The load resistor $R_5$ of the vidicon pickup tube is also connected to the terminal point E. The target bias voltage and possibly calibration, control and compensating voltages are applied to the vidicon target, by way of this resistor $R_5$. In order to obtain a small control time constant, capacitor $C_k$ should have as low a value as possible. The grid of valve II is, as in conventional cascade stages, connected to ground by means of a capacitor $C_2$. The potential of the grid is maintained at an appropriate value through means of a voltage divider comprised of resistors $R_2$ and $R_3$. The load resistor of the impedance converter stage III consists of the parallel combination of the resistor $R_d$, connected in series with a resistor $R_1$. The negative feedback voltage across the resistor $R_1$ is taken at the circuit point *k* and applied to the control grid of valve 1, by way of a coupling resistor $R_g$ having a high value negative feedback. The output voltage is taken from the cathode of valve III.

The time constant of the resistor-capacitor network $R_d—C_d$ is chosen so that any pulse level droop of low frequency signal pulses is at least partially compensated. A bias voltage minus $U_g$ is applied to resistor $R_1$ for providing a suitable value of bias potential at the control grid of valve I. Due to the direct-coupled negative feedback over several stages, this circuit has a very short delay time and a substantially linear frequency response. With a load resistance of 6 k ohms it provides a gain of about 100. With a negative feedback resistor of 1 megohm the circuit provides a signal-to-noise ratio (unweighted) of minus 43 db. and an equivalent noise current of 1.4 $nA_{rms}$ (for a signal current of 200 $nA_{pp}$).

An improvement of the signal-to-noise ratio at high frequency may be realized if the resistors $R_a$ and $R_g$ are provided with screening indicated as $A_s$. Preferably, the screening of resistor $R_a$ is driven from the cathode of the impedance converter stage. However, the screening may itself be formed as a tubular resistor of the same value. The "cold" end of this tubular resistor is connected with that of the resistor to be screened, whereas the "hot" end is connected with a low impedance source of alternating voltage. The latter alternating voltage is in phase with the voltage appearing across the screen resistance. In the circuit of FIG. 1, the screening of the resistor $R_a$ is connected with the cathode of valve III.

Figure 2:
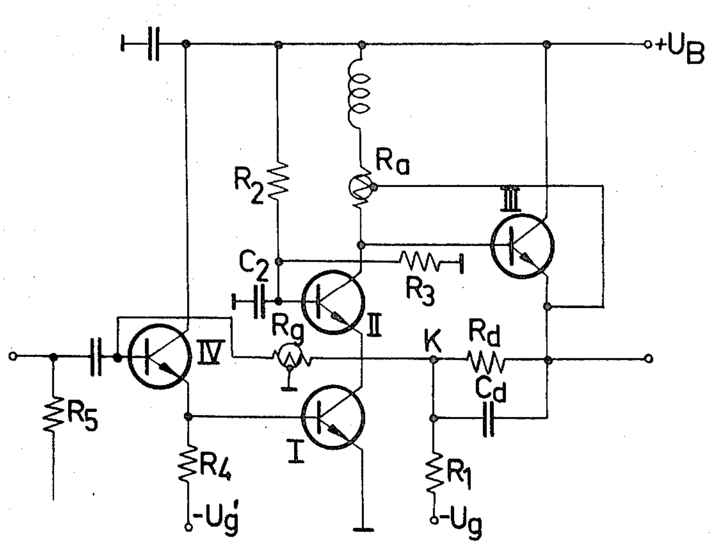
FIG. 2 is an electric schematic diagram and shows the video amplifier, in accordance with the present invention, using junction transistors.

FIG. 2 shows a further embodiment of the present invention, using only junction transistors. This circuit differs from the one described in relation to FIG. 1 only in the respect that the cascade stage is preceded by an impedance converter stage in the form of transistor IV. The negative feedback resistor $R_g$ is connected to the base of this transistor. Connecting the impedance converter stage before the cascade stage is of advantage since direct connection of the signal voltage to the cascade stage is not possible when a high signal-to-noise ratio is required. This is due to the low input resistance of the transistors.

The conditions for transistors differ from those for valves with regard to the equivalent noise resistance $R_n$. This is due to the condition that with sources of high impedance, such as when the signal is taken from a vidicon, the equivalent noise resistance attains a very high value, and becomes lower with increasing frequency. Despite this, the circuit shown can be used to obtain an unweighted signal-to-noise ratio of minus 41 db. for a signal current of 200 $nA_{pp}$. For the purpose of obtaining suitable bias levels, resistor $R_1$ is connected to minus $U_g$ and resistor $R_4$ is connected to a bias source supply minus $U'_g$. The level $U_g$ is greater than the level of $U'_g$.

Figure 2A:
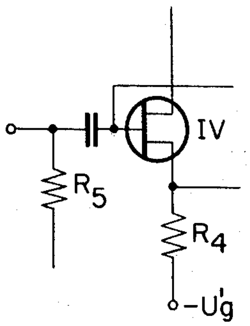
FIG. 2A shows a modification of the circuit of FIG. 2.

A significant improvement may be realized, however, if a field-effect transistor is used in the preceding impedance converter stage. FIG. 2A shows this embodiment, a field effect transistor IV replacing the transistor IV. The circuits of FIGS. 2 and 2A are otherwise exactly the same. Field-effect transistors are not yet available with a slope as high as that common in nuvistor valves. However, in the present circuit the gain of the field effect transistor is not the parameter which is particularly relied upon. Instead, it is the improved noise performance in relation to the impedance signal source, as compared with that of a junction transistor, which is of importance. With field effect transistors, the optimum noise performance at low frequencies is obtained for source internal resistances of a few megohms. Such source internal resistances are realized with vidicon pickup tubes. The field effect transistor, furthermore, provides reduction of source internal resistance at high frequencies. The reduction of source internal resistance at high frequencies is due to the influence of the input capacitance required when optimum noise performance is to be realized.

Figure 3:
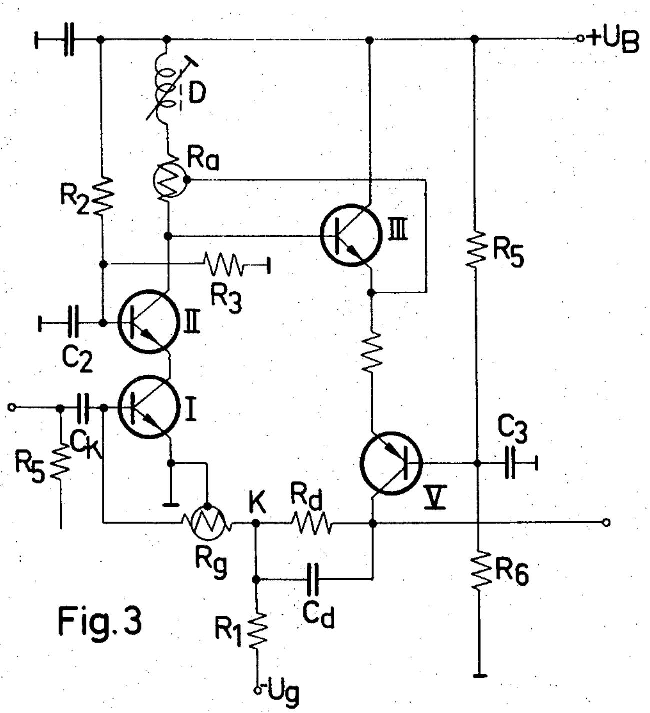
FIG. 3 is an electrical schematic diagram and shows another embodiment of the video amplifier of FIG. 2.

As shown in FIG. 3, however, it is possible to use a field effect transistor of relatively small slope as the lower amplifying element of the cascade stage. This is on the basis that the gain of the negative feedback loop is increased through the application of a further direct-coupled transistor amplifier stage. In the circuit of FIG. 3, a further amplifier stage V is connected in series with the impedance converter stage III. The emitter of the amplifier stage V is driven by fluctuations of the emitter potential of the impedance converter stage III. The base of the transistor V is maintained at a desired DC potential through the voltage divider consisting of resistors $R_5$ and $R_6$. The capacitor $C_3$ connected to ground serves to maintain the potential of the base of transistor V constant. In this amplifier which is also entirely of direct coupling, a substantially linear frequency response and a very short delay time are obtained.

Figure 4:
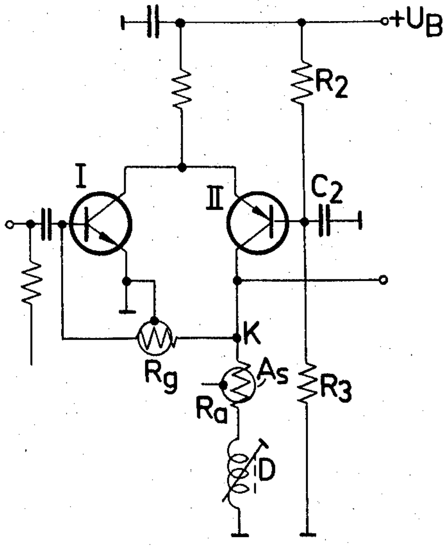
FIG. 4 is an electrical schematic diagram and shows the video amplifier with field effect transistors according to the present invention.

FIG. 4 shows a cascade stage in which the lower portion consists of a transistor I, and the upper state includes a transistor II. The two transistors are of complementary conductivity types. In this circuit the two transistors are connected in parallel from the viewpoint of DC current. However, from the viewpoint of signal current the two transistors are connected in series. The parallel circuit on the viewpoint of DC current, allows the bias potential of the base of transistor I to be very simply applied, by way of the negative feedback resistance $R_g$. This cascade stage is followed by an impedance converter stage (not shown) from which the screening $A_s$ of the resistor $R_a$ may be driven. This cascade stage may be used to replace the stage shown in FIG. 3.

When a circuit arrangement as described above in relation to FIG. 3 is used with a field effect transistor driver stage, and unweighted signal to noise ratio of minus 44.3 db. at a signal current of 200 nA may be realized. The equivalent noise current is 1.2 $nA_{rms}$.

As a general consideration, care must be exercised that the resistors connected to the amplifier input are minimum in number. These resistors should also be of high a value as possible. The amplifier section encompassed by the feedback loop shall have as high a gain as possible. In a preferable arrangement, only the load resistance of the signal source (television pickup tube) and the negative feedback resistor are connected to the input of the amplifier. In such an arrangement, therefore, monitoring and control signals for the television pickup tube are applied only to the supply side of the load resistor.

Further cascade stages having similar high signal-to-noise ratios, but differing in design detail from those described above, may also be constructed. This will be apparent to those skilled in the art.

It will be understood that each of the elements described above, or two or more together, may also find a useful application in other types of low-noise signal amplifiers differing from the types described above.

While the invention has been illustrated and described as embodied in a low-noise signal amplifier, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A signal amplifier comprising, in combination, a cascode arrangement of two amplifying elements, one of said amplifying elements being connected as a grounded emitter circuit and the other of said amplifying elements being connected as a grounded base circuit; an emitter follower input stage with output connected to the input of said cascade arrangement; load resistor means of said cascade arrangement across which the output signal of said amplifier appears; and impedance means substantially high in impedance compared to said input stage and connected between the input of said emitter follower stage and said load resistor means, the input of said emitter follower input stage being the input to said amplifier.

2. The signal amplifier as defined in claim 1, including coupling resistor means connected between the input and the output of said signal amplifier.

3. The signal amplifier as defined in claim 1, wherein said impedance means is at least 1 megohm.

4. The signal amplifier as defined in claim 1, including input resistor means connected to said emitter follower input stage of said amplifier, the input signal to be amplified by said amplifier being applied to the junction of said input stage and said input resistor means.

5. The signal amplifier as defined in claim 1, including capacitor means connected to said emitter follower input stage, the input signal to said amplifier being applied to said input stage through said capacitor means.

6. The signal amplifier as defined in claim 1, wherein said load resistor means comprises a voltage divider having a branch connected across said impedance means, said branch having substantially low ohmic value compared to said impedance means.

7. A signal amplifier comprising, in combination, a cascade arrangement of two amplifying junction transistors, one of said transistors being connected as a grounded emitter circuit and the other of said transistors being connected as a grounded base circuit; a source follower input stage having a field effect transistor, said input stage having an output connected to the input of said cascade arrangement; load resistor means of said cascade arrangement across which the output signal of said amplifier appears; and impedance means substantially high in impedance compared to said input stage and connected between the input of said source follower and said load resistor means, the input of said source follower input stage being the input to said amplifier.

8. A transistor signal amplifier comprising, in combination, a cascade arrangement of two semiconductor elements, one of said elements being connected as a grounded emitter circuit and the other of said elements being connected as a grounded base circuit; a source follower input stage having a field effect transistor, said input stage having an output connected to the input of said cascade arrangement; load resistor means of said cascade arrangement across which the output signal of said amplifier appears; and impedance means substantially high in impedance compared to said input stage and connected between the input of said source follower and said load resistor means, the input of said source follower input stage being the input to said amplifier.